United States Patent [19]
Fertl et al.

[11] 3,893,522
[45] July 8, 1975

[54] METHOD OF DETERMINING REDOX POTENTIAL

[75] Inventors: Walter H. Fertl; Paul J. Zuvanich, both of Ponca City, Okla.

[73] Assignee: Continental Oil Company, Ponca City, Okla.

[22] Filed: June 27, 1973

[21] Appl. No.: 374,206

[52] U.S. Cl. .............. 175/50; 73/152; 166/254
[51] Int. Cl. ............................ E21b 47/00
[58] Field of Search ........ 175/40, 50; 166/250, 254; 324/1, 10; 23/230 EP; 73/151, 152

[56] References Cited
UNITED STATES PATENTS

| | | | |
|---|---|---|---|
| 2,387,513 | 10/1945 | Hocott | 23/230 EP X |
| 3,098,198 | 7/1963 | Salimbeni | 324/1 |
| 3,182,735 | 5/1965 | Salimbeni et al. | 175/50 |
| 3,538,425 | 11/1970 | Veneziani | 324/1 |
| 3,711,765 | 1/1973 | Overton | 324/1 |
| 3,722,606 | 3/1973 | Fertl et al. | 175/50 |

OTHER PUBLICATIONS

Clark, W. M., Oxidation–Reduction Potentials of Organic Systems, London, Baillière Tindall & Cox, 1960, pp. 310–313, QD 281 C 55.

*Primary Examiner*—Frank L. Abbott
*Assistant Examiner*—Richard E. Favreau
*Attorney, Agent, or Firm*—Kotarski, Jr., Joseph C.

[57] ABSTRACT

Method of rapidly determining the redox potential of a system wherein redox potential measurements are made two or more times within the first few minutes of immersion of the measuring electrodes into the system, the values plotted versus a time factor and an extrapolation made to infinite time.

5 Claims, 3 Drawing Figures

METHOD OF DETERMINING REDOX POTENTIAL

BACKGROUND OF THE INVENTION

1. Field of the Invention

This invention involves an improved method of determining the redox potential of various systems. More particularly, this invention involves such a method which requires a relatively short time for measurement and which is especially suited to make measurements on samples of subterranean formation rock circulated out of a well during drilling of the well.

2. Description of the Prior Art

A common property determined in various systems is the oxidation-reduction potential, often referred to as the redox potential. U.S. Pat. No. 3,722,606 issued Mar. 19, 1973, describes a method of detecting abnormally pressured formations during the drilling of a well by measuring and comparing the redox potential of samples of the formation being drilled at various depths. When the rate of change of redox potential with depth begins to change sharply, the approach of the drill bit to an abnormally pressured formation is indicated. At this point, controlled drilling procedures are instigated so that when the abnormally pressured zone is penetrated, the drilling fluid composition can be altered to balance the drilling pressure against the formation pressure. Thus, well blowouts, sticking of the drill bit, or other results of an imbalance between the drilling fluid pressure and the pressure of the formation being drilled which may result in the loss of the well may be avoided.

As previously carried out, the determination of redox potential of formation samples or any other system is a lengthy time consuming process. The observed redox potential changes depending on how long the electrodes used to make the measurement have been immersed in the sample. The readings generally decrease with time and reach a constant value only after one-half to 1 hour or longer. Where a series of determinations are to be made sequentially or at about the same time, this delay in obtaining a constant redox potential value can be onerous.

It is an object of this invention to determine the redox potential of a system in a relatively short time. It is another object to determine the redox potential more accurately utilizing presently existing equipment. It is a further object to predict abnormally pressured formations during the drilling of a well by utilizing an improved method of measuring redox potential. Other objects, advantages, and features will become apparent from the following specification considered with the appended claims.

SUMMARY OF THE INVENTION

A method of determining the redox potential of a fluid system comprising immersing a pair of suitable electrodes in the system, continuously or periodically observing the redox potential over a relatively short period of time of about 5 minutes, graphing on linear graph paper the redox potential versus a time factor during this time period, and extrapolating to infinite time. This rapidly obtained accurate redox value is obtained on a series of fluid samples prepared from subterranean formation removed from a drilling well at various depths. The extrapolated redox potential is plotted versus depth. When the rate of change of redox potential versus depth begins to change rapidly, controlled drilling procedures are instigated in further drilling of the well. When these controlled drilling procedures indicate that an abnormally pressured zone has been penetrated, the weight of the drilling fluid is changed to balance the same against the formation pressure.

DESCRIPTION OF THE PREFERRED EMBODIMENT

Figure 1:
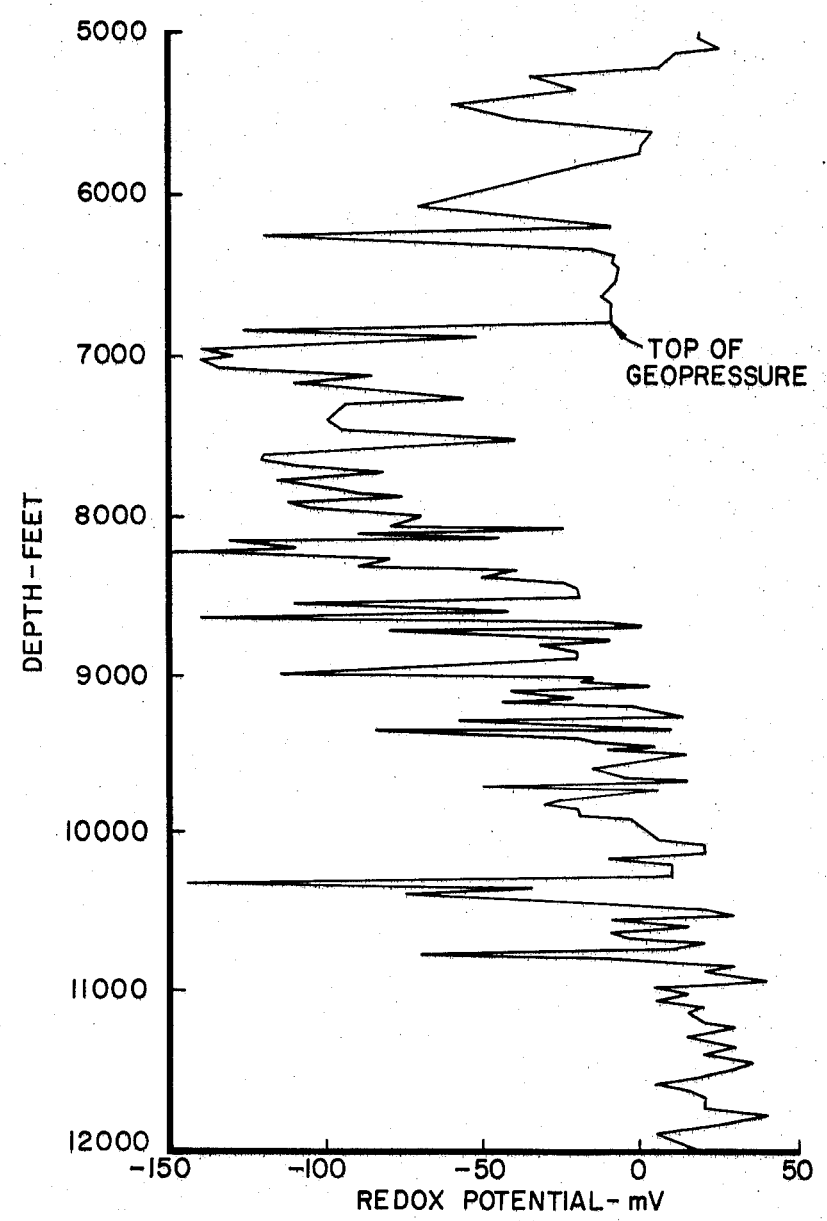
FIG. 1 is a plot of redox potential measured according to previously known procedures versus depth made on cuttings from a well being drilled.

Many systems contain a substance in two oxidation states in equilibrium with each other.

Reduced State $\rightleftarrows$ Oxidized State $+ n$ Electrons

The potential of such a system is given by the general equation:

$Eh = Eo - (RT/nF$ ln (Oxidized State)/(Reduced State)

where $n$ is the number of electrons difference between the two states, $Eh$ is the potential measured with respect to the hydrogen electrode or redox potential, $Eo$ is the standard oxidation-reduction potential, $R$ is the universal gas constant, $F$ is the Faraday's constant, $T$ is the absolute temperature of the system, and the parenthetical expression is the molar concentration of the substance. The redox potential, $Eh$, can be measured by a two-electrode system. Typically, two-electrode systems are a platinum indicator electrode and a saturated calomel, glass or silver-silver chloride reference electrode, preferably with a salt bridge. Suitable apparatus and methods, such as those mentioned above, are well known for determining $Eh$, and any such apparatus or method may be used in connection with this invention.

A reading can be obtained as soon as the electrodes of the measuring apparatus are immersed in a system. However, the reading changes as time of contact between the electrodes and the system elapses. The following table shows the measured redox potential values of an aqueous slurry of cuttings from a well being drilled wherein readings were made at various time intervals following immersion of a platinum indicator electrode and a saturated calomel reference electrode in the aqueous slurry of cuttings.

TABLE

| Time Electrodes in Contract with System (Minutes) | Redox Potential (Millivolts) |
|---|---|
| 1 | 81 |
| 2 | 74 |
| 3 | 69 |
| 4 | 65 |
| 5 | 61.5 |
| 30 | 48 |
| 45 | 48 |

The table shows that the redox potential decreases with time of contact between the electrodes and the system. The rate of decrease slows down with time and is relatively constant after 30 minutes. Thus, constant measurements can be obtained after a substantial time interval from the beginning of the test. However, in many instances, it is inconvenient to wait a prolonged length of time for the readings to become constant. In other instances where some action must be taken based on the results of the redox determination, it is imperative that the readings be obtained as quickly as possible.

An example of an instance in which it is desirable to obtain redox measurements within a short time is in the aforementioned drilling of geopressured formations. In such drilling operations, samples are periodically obtained of cuttings circulated out of the wellbore along with the drilling fluid during drilling of the normally pressured zones. The cuttings are separated from the drilling fluid, such as by collecting the cuttings on a screen. The cuttings are washed with water or brine to remove any drilling fluid adhering thereto. The cuttings are then mixed with water to form a slurry, such as by grinding the cuttings to a fine particle size prior to mixing them with water or by blending them with water for a few minutes in an electric blender. Electrodes are immersed in the resulting slurry and the redox potential determined.

The redox potential is plotted on linear graph paper versus depth from which the sample was obtained. When the rate of change of redox potential with depth begins to change rapidly, it is indicative that a geopressured zone lies a few hundred feet below that depth. At this time controlled drilling procedures are instigated, such as, keeping constant weight on the drill bit and maintaining a constant drill bit speed while monitoring the penetration rate. When the controlled drilling procedures indicate that the geopressured zone has been penetrated, the pressure of drilling fluid is balanced against the increase in formation pressure. With liquid drilling fluid, this is accomplished by increasing the density of the drilling fluid. Thus, the drilling operations can proceed without danger of a blowout due to the geopressure. Geopressure zones are zones of subterranean strata where the formation pressure is abnormally high, i.e., is higher than would be expected from the weight of the overburden. The occurrence of geopressures is well known in the art. U.S. Pat. No. 3,722,606, issued Mar. 27, 1973, to Fertl et al., further describes this phenomenon and the detection thereof by measuring redox potentials.

Thus, it can be seen that in order to insure that a blowout does not occur, redox measurements must be obtained as rapidly as possible so that the necessary plot of redox value versus depth can be prepared and any necessary change in drilling procedures instituted as soon as possible.

It was found that if two or more redox measurements were made within the first few minutes after immersion of the electrodes in the system, a plot made of the redox potential versus a time factor and the results extrapolated to infinite time, the extrapolated value was almost the same value as that obtained after the electrodes had been immersed in the system for 30 minutes or longer. For example, a plot of the redox potential readings from the above table taken over the first five minutes and extrapolated gave a value of 47.5 millivolts at infinite time. This corresponds to a value of 48 millivolts obtained after 30 minutes and 45 minutes in actual measurements. For most purposes the extrapolated value of 47.5 millivolts could be substituted for the actual value of 48 millivolts.

The plot can conveniently be made on linear graph paper with redox potential as one coordinate and 1/time in minutes as the other coordinate. The redox potential can be observed continuously or periodically. It is preferred to at least observe the redox potential after the electrodes have been in contact with the system for four minute and five minutes. Readings made for less than 1 minute are of limited value as the readings are changing rapidly. Readings made after about five minutes confirm the trend but are seldom required. Extrapolation is then made by connecting at least two readings, say a 4-minute reading and a 5-minute reading, with a straight line and extending this straight line until it intercepts the redox coordinate at infinite time. This intercept is taken as equivalent to the stable redox value which would be obtained if the test were allowed to continue for 30 minutes to 1 hour or longer.

EXAMPLES

FIG. 1 shows a plot of redox potential versus depth for a well drilled in Aransas County, Tex. The redox potential measurements were made on cuttings removed from the well during drilling, washed, and slurried with distilled water as described above. The redox value used was that obtained following previously known methods wherein the readings were allowed to become constant before being recorded. This required each determination to be carried out for from 30 minutes to one hour following immersion of the electrodes into the slurry.

Figure 2:
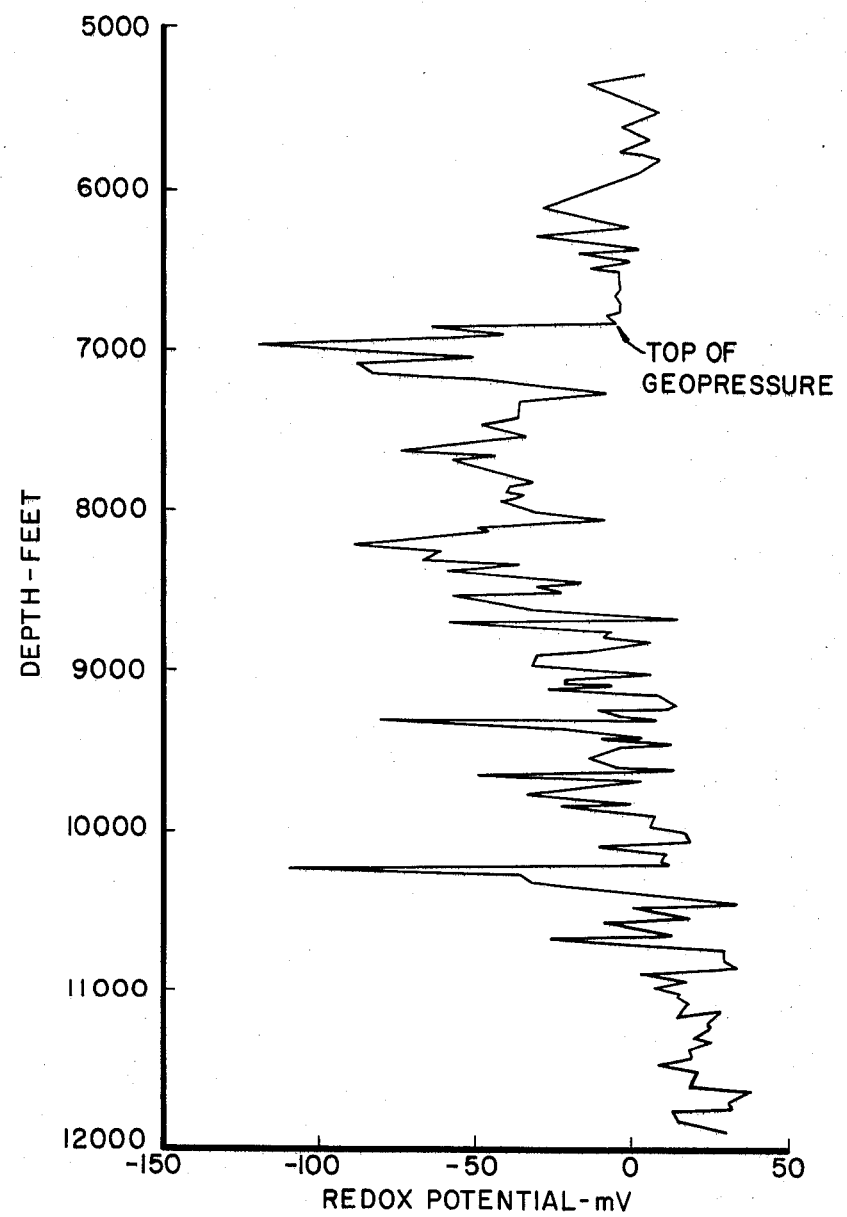
FIG. 2 is a similar plot made using redox potential measured according to the procedures of this invention.
Figure 3:
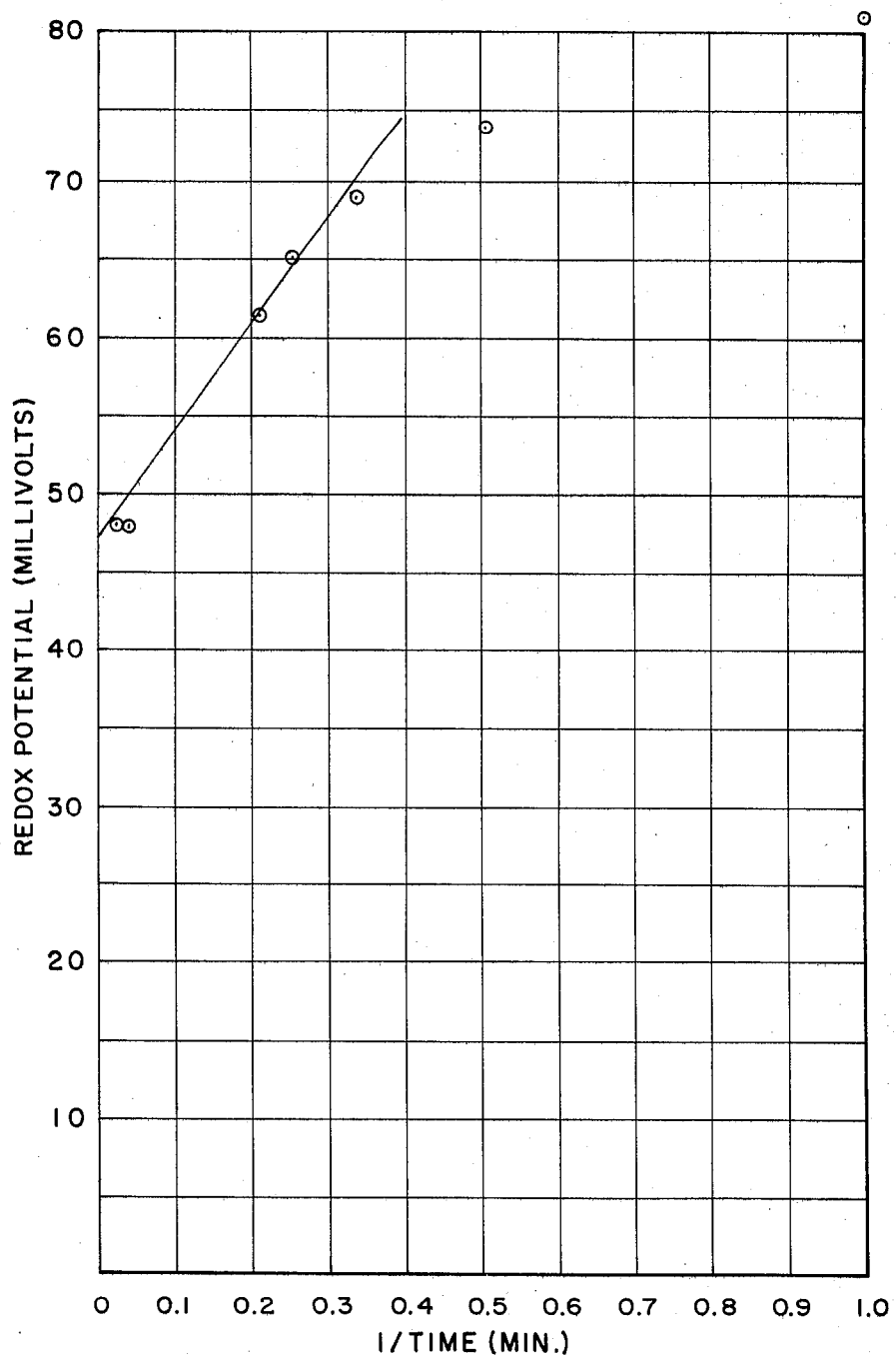
FIG. 3 is a plot of redox potential values measured according to the process of this invention, plotted versus the time factor 1/time.

FIG. 2 shows a plot of redox potential versus depth for the same well using the same samples but measuring the redox potential according to the method of this invention. The redox potential was observed four minute and five minutes after immersing the electrodes in the system. These two values were plotted versus 1/time in minutes and an extrapolation made to infinite time. The extrapolation to infinite time was plotted versus depth. A comparison of FIGS. 1 and 2 shows that both plots indicate a change in the rate of change of redox potential with depth occurring at a depth of about 6,800 feet. Thus, the plot of FIG. 2 using extrapolated redox potential values obtained over a relatively short time gave just as good an indication of an impending geopressure zone as did the plot of FIG. 1 using constant redox potential values obtained over a relatively long time.

The forgoing discussion and description have been made in connection with preferred specific embodiments of the process for determining redox potential values in a short time. However, it is to be understood that the discussion and description of the invention is only intended to illustrate and teach those skilled in the art how to practice the process and is not to unduly limit the scope of the invention which is defined and claimed hereafter.

We claim:

1. A method of determining the redox potential of a fluid system comprising:
   a. contacting said fluid system with a two electrode redox potential measuring system,
   b. observing the redox potential values after the measuring system is in contact with the fluid system for four minutes and for 5 minutes, c. plotting on linear graph paper the observed redox potential versus the time factor 1/time, and d. drawing a straight line through the plotted redox potential values and extrapolating to infinite time to give the desired infinite time value of the redox potential.

2. The method of claim 1 wherein the two electrode redox potential measuring system comprises an indicator electrode, a reference electrode and a potentiometer.

3. A method for detecting the approach of an underlying abnormally pressured zone while drilling normally pressured zones of a subterranean strata comprising:

a. drilling the normally pressured zones with a drilling fluid whose pressure is balanced against the subterranean strata pressure, b. periodically preparing an aqueous slurry of cuttings removed from the well, c. contacting said aqueous slurry with a two electrode redox potential measuring system, d. observing the redox potential value 4 minutes and five minutes after the measuring system is in contact with the aqueous slurry, e. making a first plot on linear graph paper of the observed redox potential values versus the time factor 1/time, f. drawing a straight kine through the plotted redox potential values to give the desired infinite time value of the redox potential, g. making a second plot on linear graph paper of the extrapolated redox potential value versus depth from which the cuttings in the aqueous slurry came, h. when the rate of change of extraploated redox potential with depth begins to change greatly, instituting controlled drilling procedures, and i. when the abnormally pressured zone is penetrated, adjusting the drilling fluid pressure to balance the same against the pressure in the abnormally pressured zone.

4. The method of claim 3 wherein the two electrode redox potential measuring system comprises an indicator electrode, a reference electrode and a potentiometer.

5. The method of claim 3 wherein the controlled drilling procedures instituted comprise keeping a constant rotary speed and weight on the bit while monitoring the penetration rate.

* * * * *